Feb. 6, 1945.  H. R. CRAGO  2,368,642
AIR TEMPERATURE CONTROL SYSTEM FOR SUPERCHARGED
INTERNAL-COMBUSTION ENGINES
Filed Dec. 12, 1942
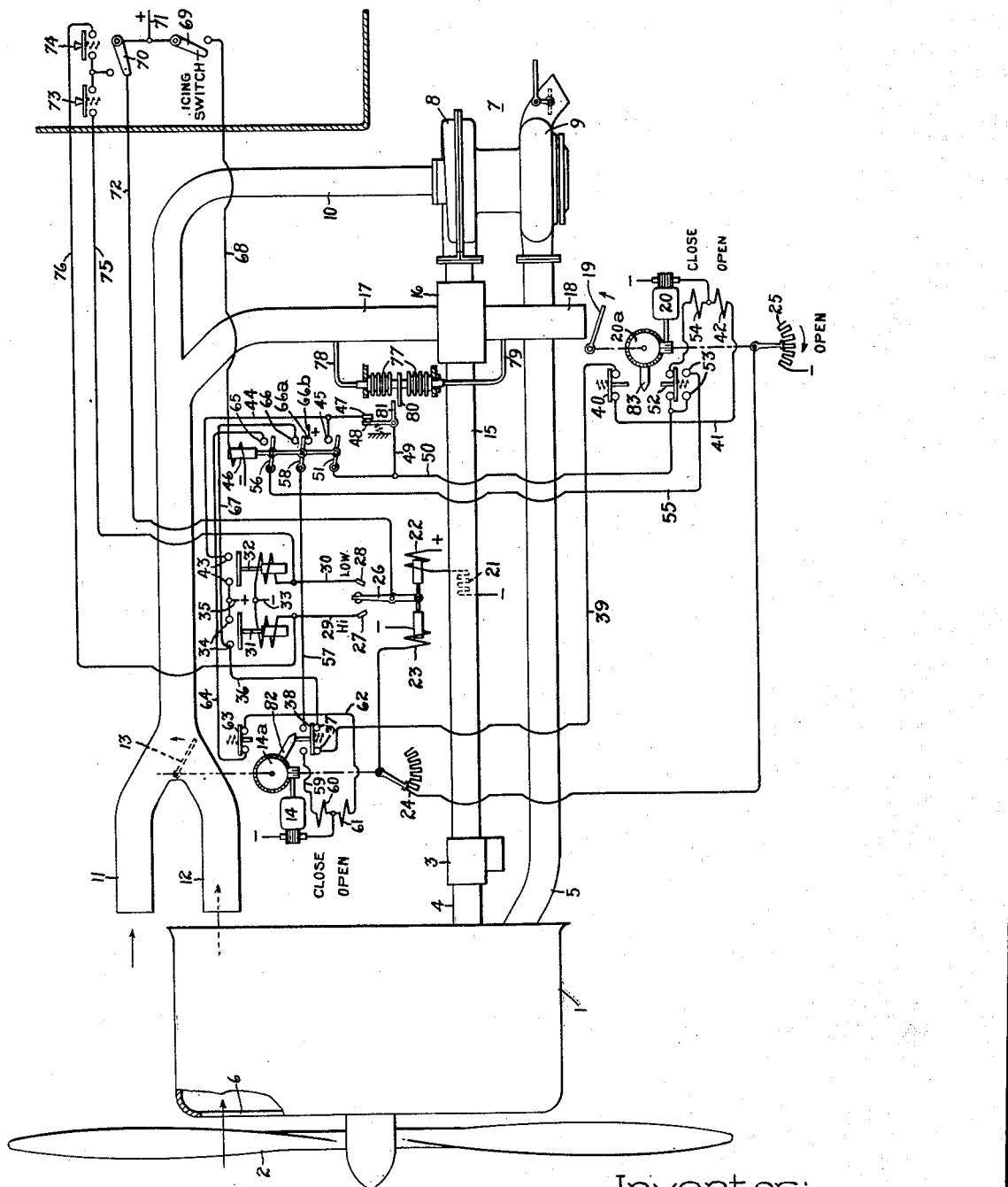
Inventor:
Harry R. Crago,
by Harry E. Dunham
His Attorney.

Patented Feb. 6, 1945

2,368,642

UNITED STATES PATENT OFFICE 2,368,642

AIR TEMPERATURE CONTROL SYSTEM FOR SUPERCHARGED INTERNAL - COMBUSTION ENGINES

Harry R. Crago, Schenectady, N. Y., assignor to General Electric Company, a corporation of New York Application December 12, 1942, Serial No. 468,829

7 Claims. (Cl. 123—122)

The present invention relates to systems for controlling the temperature of air supplied by a supercharger to an internal combustion engine. It is well adapted for use with aircraft engines and it is this application of my invention which I have elected specifically to illustrate and describe. It is to be understood, however, that this is only by way of example and that the invention may be used wherever found applicable.

The invention relates particularly to supercharger installations wherein there is provided an intercooler between the discharge side of the supercharger and the engine carburetor for cooling the air supplied to the carburetor, which intercooler is provided with valve means for regulating the flow of cooling medium therethrough and wherein there is provided means for regulating the temperature of the air supplied to the inlet of the compressor.

An object of my invention is to provide an improved construction and arrangement for regulating the means above referred to to control the temperature of the air supplied to the carburetor, and for a consideration of what I believe to be novel and my invention, attention is directed to the following specification and to the claims appended thereto.

In the drawing, the figure is a diagrammatic view of a control system embodying my invention.

Referring to the drawing, 1 indicates a part of an aircraft nacelle in which is housed an aircraft engine (not shown) which drives an aircraft propeller 2. The carburetor for the engine is indicated at 3, it being connected to the intake manifold by a conduit 4. The exhaust conduit for the engine is indicated at 5. In the nacelle are openings 6 for the flow of cooling air over the engine.

At 7 is indicated a supercharger, in the present instance a turbosupercharger, comprising a compressor 8 and a gas turbine 9. The inlet of the compressor is connected by a conduit 10 to air supply conduits 11 and 12. Air supply conduit 11 faces into the slip stream whereby it is adapted to supply air to the compressor 8 directly from atmosphere and at the temperature of the atmospheric air. Conduit 12 faces toward the engine and is adapted to take cooling air which has passed over the engine for cooling the engine. This means that conduit 12 supplies air at a temperature higher than that supplied by conduit 11. Between conduits 11 and 12 is a flap valve 13 adapted to be positioned by a reversing electric motor 14, being connected to it through a suitable gearing 14a. By adjusting flap valve 13 air may be supplied to the compressor from either conduit 11 or conduit 12, or partly from one conduit and partly from the other. In the position of the valve shown in the drawing air is supplied from the slip stream through conduit 11. By moving valve 13 in the direction indicated by the arrow, the supply of air through conduit 11 can be gradually diminished and air supplied in varying quantities through the conduit 12. By this arrangement, the temperature of the air supplied to compressor 8 can be graduated from that of the temperature of the slip stream air to that of the temperature of the cooling air which is passed over the engine.

The discharge side of compressor 8 is connected to carburetor 3 by a conduit 15, there being arranged in conduit 15 an intercooler 16 for cooling the air discharged from compressor 8. Intercooler 16 may be of any suitable construction, the arrangement being such that the air to be cooled flows through it and also cooling air. In the present instance, the cooling air is shown as being supplied to intercooler 16 by a conduit 17 and as being discharged therefrom through a conduit 18. Conduit 17 may receive cooling air from any suitable point, preferably the slip stream of the aircraft. In the present instance, it is shown as being connected in parallel with conduit 10 whereby it receives cooling air from the slip stream through conduit 11 or conduit 12. The flow of cooling air through intercooler 16 is controlled by a flap valve 19 which is adapted to cover and uncover the discharge end of conduit 18. Flap valve 19 is positioned by means of a reversing electric motor 20, being connected to it through a suitable gearing 20a. The volume of cooling air flowing through intercooler 16 can be varied by positioning flap valve 19 relatively to the end of conduit 18, the flow being entirely cut off when flap valve 19 is closed against the end of the conduit.

The inlet of the gas turbine nozzle box is connected to exhaust conduit 5. A known structure of turbo-supercharger is indicated in the drawing. It is to be taken as typical of any suitable supercharger.

My invention has to do particularly with the means for regulating the flap valves 13 and 19 to regulate the temperature of the air supplied to the carburetor. In conduit 15, between intercooler 16 and the carburetor, is arranged a temperature responsive device 21 which may be of any suitable type. In the present instance, it is shown as being in the form of a thermo-sensitive resistor 21, i. e., an electrical conductor, the resistance of which varies with its temperature. Resistor 21 is connected in circuit with one winding 22 of a balanced relay, the other winding 23 of which is connected in series with an adjustable resistance 24 operated from the shaft of motor 14, and a second adjustable resistance 25 operated from the shaft of motor 20. The contact arm 26 of the balanced relay is adapted to engage contacts 27 and 28 of the relay when the relay becomes unbalanced. Thermo-sensitive resistor 21 is of a type such that its resistance increases with decrease in temperature and decreases with increase in temperature. Accordingly, when the temperature of resistor 21 decreases, the flow of current through winding 22 of the balanced relay decreases whereupon contact arm 26 engages contact 28 and when the temperature of resistor 21 increases, the flow of current through winding 22 of the balanced relay increases whereupon contact arm 26 is moved into engagement with contact 27. Contacts 27 and 28 are connected by conductors 29 and 30 respectively with the windings of relays 31 and 32 which windings are grounded as is indicated at 33. Relay 31, when energized, bridges a pair of contacts 34, one of which is connected to a source of energy indicated at 35 and the other of which is connected by a conductor 36 to one of a pair of back contacts 37 of a limit switch 38 for motor 14. The other of the pair of contacts 37 is connected by a conductor 39 to one of the contacts of a limit switch 40 for motor 20, the other contact of which is connected by a conductor 41 to one of the fields 42 of motor 20.

Relay 32, when energized, bridges a pair of contacts 43, one of which is connected to source 35 and the other of which is connected by a conductor 44 to a contact 45 of a relay 46 and to a fixed contact 47. Normally, engaging contact 47 is a contact arm 48 which is biased into engagement with contact 47 by a suitable spring and is connected by a conductor 49 to a conductor 50. One end of conductor 50 is connected to a relay arm 51 of relay 46 and the other is connected to one of the contacts of a limit switch 52 for motor 20 and also to one of a pair of back contacts 53 of limit switch 52. The other of the pair of limit switch contacts is connected to field 54 of motor 20. The other of the pair of back contacts 53 is connected by a conductor 55 to an arm 56 of relay 46. The forward contacts of limit switch 38 are connected respectively by a conductor 57 to a contact arm 58 of relay 46 and by a conductor 59 to field winding 60 of motor 14. The other field winding 61 of motor 14 is connected by a conductor 62 through a limit switch 63 and a conductor 64 to a contact 65 of relay 46. In relay 46 is a contact 66 connected by a conductor 67 to one of the relay contacts 34 and through conductor 36 to one of the limit switch back contacts 37; also a contact 66a connected by a conductor 66b to a source of current. The winding of relay 46 is connected in a circuit 68 which includes an icing switch 69 located in the cockpit of the aircraft. Also, in the cockpit of the aircraft is a hand switch 70 adapted to connect a source of energy 71 to either a conductor 72 connected with balanced relay contact arm 26 or to a pair of push buttons 73 and 74 which are connected respectively by conductors 75 and 76 to conductors 30 and 29, respectively, i. e., directly to balanced relay contacts 28 and 27.

Contact arm 48 is controlled by a device responsive to the drop in pressure across intercooler 16. In the present instance, this device is shown as comprising a pair of opposed bellows 77 connected by pipes 78 and 79 to conduits 17 and 18, respectively. When the drop in pressure across intercooler 16 reaches a predetermined low value, a finger 80 carried by bellows 77 engages a finger 81 connected to contact arm 48 to move it out of engagement with contact 47.

The limit switches for motors 14 and 20 are actuated by arms 82 and 83, respectively, carried by gearings 14a and 20a. Referring to motor 14, limit switch 38 is opened and its connector moved into engagement with back contacts 37 when flap valve 13 reaches a position in which conduit 12 is closed, and limit switch 63 is opened when flap valve 13 reaches a position in which conduit 11 is closed. Referring to motor 20, limit switch 40 is opened when flap valve 19 is fully open and limit switch 52 is opened and its connector moved into engagement with back contacts 53 when flap valve 19 is fully closed.

The operation is as follows: When it is desired to control automatically the temperature of the air supplied by the compressor to the carburetor, hand switch 70 is placed in the position shown in the drawing, thus connecting source 71 to the arm of balanced relay 26, and icing switch 69 is open. In the position of the parts shown in the drawing, flap valve 13 is shown as being in a position wherein conduit 12 is shut off, air to the compressor and intercooler being supplied through conduit 11. In this position of flap valve 13, limit switch 38 is open and its connector is in engagement with back contacts 37. Flap valve 19 is shown as being in an intermediate position, it being so positioned that the cooling air flowing through intercooler 16 cools the air supplied to the carburetor to the desired temperature.

If the temperature of the air flowing through conduit 15 to carburetor 3 increases, the temperature of resistor 21 increases. As a result the current flowing through winding 22 of the balanced relay increases, unbalancing the relay and moving contact arm 26 into engagement with contact 27. This closes a circuit on the winding of relay 31 from source 71 through conductor 72, arm 26, and conductor 29 to ground at 33. Relay 31 then operates to bridge contacts 34 closing a circuit on the field 42 of motor 20 as follows: source 35, relay contacts 34, conductor 36, back contacts 37 of limit switch 38, conductor 39, limit switch 40 and conductor 41. Motor 20 now operates to open somewhat flap valve 19 to increase the flow of cooling air through intercooler 16, thus reducing the temperature of the air which is supplied to the carburetor. When motor 20 operates to open flap valve 19, it at the same time moves the contact arm of resistance 25 in a direction to decrease the resistance in circuit with winding 23 of the balanced relay, thus increasing the flow of current through winding 23. This increased flow of current increases the pull of winding 23 on the balanced relay in a direction to effect the restoring of contact arm 26 to its normal position between contacts 27 and 28. Owing to the increase in the flow of current in winding 23, however, the mechanism will become stabilized at a slightly higher air temperature.

If the temperature of the air flowing through conduit 15 to the carburetor 3 decreases, the temperature of resistor 21 decreases. As a result, the current flowing in winding 22 of the balanced relay decreases, unbalancing the relay and effecting movement of contact arm 26 into engagement with contact 28. This closes the circuit on the winding of relay 32 from source 71 through conductor 72, contact arm 26 and conductor 30 to ground at 33. Relay 32 then operates to bridge contacts 43, closing a circuit on the field 54 of motor 20 as follows: source 35, relay contacts 43, conductor 44, switch contacts 47 and 48, conductor 49, conductor 50 and limit switch 52 through winding 54 to ground. Motor 20 now operates to close somewhat flap valve 19 to decrease the flow of cooling air through intercooler 16, thus increasing the temperature of the air supplied to the carburetor. When motor 20 operates to close flap valve 19, it at the same time moves the contact arm of resistance 25 in a direction to increase the resistance in circuit with winding 23 of the balanced relay, thus decreasing the flow of current through winding 23. This decreased flow of current decreases the pull of winding 23 acting on the balanced relay tending to permit the balanced relay to move in a direction to restore contact arm 26 to its normal position between contacts 27 and 28. Owing to the decrease in the flow of current in winding 23, however, the mechanism will be stabilized at a slightly lower air temperature.

The adjusting of resistance 25 in the circuit of the balanced relay winding 23 serves to give to the control a certain breadth or range of regulation. In other words, the temperature of the air flowing in conduit 15 is made to vary somewhat with the degree of opening of flap valve 19. This serves to stabilize the governing and to prevent hunting.

In the manner described, flap valve 19 will be adjusted in response to temperature changes in the air flowing through conduit 15 to hold such temperature substantially constant.

Under normal operating conditions, where no ice is forming in the carburetor, it is desirable to open the cooling flap valve 19 only the amount required to insure the carburetor air being maintained below a predetermined high value where detonation in the engine results. However, lower temperature of the carburetor air is advantageous under these conditions. Accordingly, it is desirable to arrange the mechanism so that ordinarily it insures only that the temperature of the air shall not exceed a predetermined high value, it being permitted to assume a lower value. To this end, the arrangement is such that flap valve 19 having been adjusted to a predetermined open position by the temperature of the air flowing in conduit 15, it will not be moved again toward closed position as long as the drop in pressure of the cooling air across intercooler 16 does not increase beyond a predetermined high value. As shown in the drawing, it is assumed that the drop in pressure of the cooling air across intercooler 16 exceeds a predetermined high value so that bellows 77 have moved finger 80 out of engagement with finger 81, permitting contact 48 to engage contact 47. However, if the drop in pressure of the cooling air across intercooler 16 is below such predetermined high value, then finger 80 engages finger 81 to move contact 48 away from contact 47. This opens the circuit on field winding 54 of motor 20 so that even though the temperature of the air decreases to a value such that contact 26 of the balanced relay engages contact 28 and operates relay 32, still flap valve 19 will not be moved toward closed position. This condition will obtain until such time as the drop in pressure of the cooling air across intercooler 16 exceeds a predetermined value so as to permit contact 48 to move into engagement with contact 47. In other words, under the operating conditions described closing of flap valve 19 is under control not only of the carburetor air temperature but also of the drop in pressure of the cooling air across the intercooler.

Opening movement of flap valve 19 is limited by motor limit switch 40; closing movement is limited by motor limit switch 52. When flap valve 19 reaches its final closed position, limit switch 52 is opened and its connector is brought into engagement with back contacts 53.

If at any time the operator finds the carburetor temperature is too low or that carburetor ice is forming, he closes icing switch 69. This closes a circuit on the winding of relay 46 from source 71 through conductor 68, causing the relay to pick up to bring relay contact arms 51, 56 and 58 into engagement with relay contacts 45, 65 and 66, respectively. Now if balanced relay contact arm 26 moves into engagement with contact 28 the winding of relay 32 will be energized and contacts 43 connected to each other. This closes a circuit on motor 14 to operate it to move flap valve 13 in a direction to uncover conduit 12 and close conduit 11, the circuit being as follows: source 35, relay contacts 43, conductor 44, relay contact arm 51, conductor 50, limit switch back contacts 53, conductor 55, relay contact arm 56, conductor 64, motor limit switch 63, conductor 62 and motor field winding 61 to ground. Movement of flap valve 13 serves to cut down the amount of cooling air entering through conduit 11 and to admit warmer air through conduit 12; in other words, to increase the temperature of the air supplied to compressor 8. At this time, no cooling air is being supplied to intercooler 16 since flap valve 19 is in closed position. Increasing the temperature of the air supplied to compressor 8 means that the temperature of the air delivered by the compressor, that is the carburetor air temperature, will be increased. Operation of motor 14 serves to adjust rheostat 24 in a direction to increase the resistance in the circuit of balanced relay winding 23 with the result already described in connection with the description of the operation of resistance 25. As a result, when the temperature of the carburetor air reaches a predetermined higher value, balanced relay contact arm 26 is returned to its normal open position between contacts 27 and 28.

When motor 14 starts to operate in a direction to move flap valve 13 to uncover conduit 12, limit switch 38 is permitted to close, its connector moving from engagement with back contacts 37 into engagement with the limit switch contacts. Back contacts 37 are in circuit with field winding 42 of motor 20, the field winding which effects operation of motor 20 in a direction to open flap valve 19. As a result, it will be seen that both field winding circuits of motor 20 are open, the one field winding circuit being open at back contacts 37 and the other field winding circuit being open at limit switch 40. As a result, motor 20 is disconnected from the control circuits and cannot operate flap valve 19. It will remain disconnected until flap valve 13 is moved back to a position wherein it closes conduit 12 so that limit switch 38 is opened and its connector moved into engagement with back contacts 37. If now the temperature of the carburetor air becomes too high, balanced relay 26 operates in the manner already described to bring its contact arm 26 into engagement with contact 27, thus closing the circuit on relay winding 31, and causing the relay to bridge contacts 34. This closes a circuit on motor field winding 60 as follows: source 35, relay contacts 34, conductor 67, contact arm 58 of relay 46, conductor 57, contacts of limit switch 38 and conductor 59 through motor field 60 to ground. This effects operation of motor 14 in a direction to move flap valve 13 toward conduit 12, thus decreasing the amount of warmer air supplied through conduit 12.

With flap valve 19 closed and icing switch 69 closed, it will be seen that flap valve 13 is placed under control of thermo-sensitive resistor 21, flap valve 13 being operated to regulate the temperature of the air supplied to the inlet of the compressor to maintain the desired temperature of the carburetor air.

If with flap valve 13 under the control of thermo-sensitive resistor 21 the temperature of the carburetor air continues to increase, eventually flap valve 13 is brought back to the position shown in the drawing wherein it closes conduit 12. At this time, arm 82 engages limit switch 38, opening the limit switch and bringing its connector into engagement with back contacts 37. This transfers the control, including thermo-sensitive resistor 21, from motor 14 to motor 20 whereby, if the temperature continues to increase, motor 20 will be operated in a direction to open flap valve 19. This circuit may be traced as follows: source 35, relay contacts 34, conductor 36, relay back contacts 37, conductor 39, limit switch 40, conductor 41 and motor field 42 to ground. This effects operation of motor 20 in a direction to open flap valve 19. When motor 20 moves to open flap valve 19, limit switch 52 is permitted to close, its connector being moved away from back contacts 53. This serves to open the circuit of motor field winding 61 of motor 14 and since the circuit of motor field winding 60 of motor 14 has been opened at limit switch 38, it will be seen that motor 14 is now disconnected from the control.

As long as icing switch 69 is closed, relay 46 remains energized so that relay contact arm 51 is in engagement with contact 45. This forms a shunt connection around contacts 47 and 48 so that bellows 77 no longer can prevent operation of motor 20 in a direction to close flap valve 19. Accordingly, as long as icing switch 69 is closed, flap valves 19 and 13 are directly under control of thermo-sensitive resistor 21, the flap valves being operated in sequence; that is, after flap valve 19 is fully closed, flap valve 13 begins to operate and when flap valve 13 is again returned to its position as shown in the drawing wherein it covers conduit 12, flap valve 19 is again operated. Thus the control is transferred from motor 20 to motor 14 and from motor 14 back to motor 20 by the limit switches 52 and 38, respectively.

When operating conditions are restored to what may be considered normal, icing switch 69 may be again opened, thus in effect disconnecting the operating means for flap valve 13 from the thermo-sensitive resistor 21, leaving only flap valve 19 under its control. At the same time, this restores the effectiveness of bellows 77.

When icing switch 69 is opened permitting relay 46 to return to the position shown in the drawing, engagement of contact arm 58 with contact 66a closes a circuit directly on winding 60 of motor 14 through conductors 66b, 57 and 59 to operate motor 14 in a direction to move flap valve 13 back to the position shown in the drawing. Thus when the icing switch is opened, valve 13 will be moved immediately from whatever position it may be in back to the position where it closes conduit 12.

By moving hand switch 70 to disconnect source 71 from the contact arm 26 of the balanced relay and connecting it to push buttons 73 and 74, the operator can, by means of push buttons 73 and 74, operate directly relays 31 and 32 to operate flap valve 19 manually. If at this time the operator closes icing switch 69, he can then operate manually both the flap valve 19 and the flap valve 13. For example, by closing push button 73 and holding it closed, the operator can effect continuous operation first to close completely flap valve 19 and then move flap valve 13, if desired, to a position wherein it closes completely cold air conduit 11 whereby only heated air is supplied to the compressor through conduits 12 and 10.

By my invention, I provide a temperature control means for the air supplied by a supercharger to an engine which is simple in structure, reliable in operation and which gives the needed flexibility of control, automatic and manual.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In combination, an engine, a supercharger, a conduit connecting the discharge side of the supercharger to the engine intake, a cooler in said conduit, valve means regulating the flow of cooling medium through said cooler, a conduit for supplying air to the supercharger, valve means for regulating the temperature of the air supplied therethrough to the supercharger, and means responsive to the temperature of the cooled air discharged from the intercooler for operating said two valve means in sequence.

2. In combination, an engine, a supercharger, a conduit connecting the discharge side of the supercharger to the engine intake, a cooler in said conduit, valve means regulating the flow of cooling medium through said cooler, an electric motor for positioning said valve means, a conduit for supplying air to the supercharger, valve means for regulating the temperature of the air supplied therethrough, an electric motor for positioning said second named valve means, means responsive to the temperature of the cooled air discharged from the intercooler, and means controlled by the operation of said two valve means for connecting said temperature responsive means to said electric motors in sequence to effect sequential operation of said two valve means.

3. In combination, an engine, a supercharger, a conduit connecting the discharge side of the supercharger to the engine intake, a cooler in said conduit, valve means regulating the flow of cooling medium through said cooler, a conduit for supplying air to the supercharger, valve means for regulating the temperature of the air supplied therethrough to the supercharger, an electric motor for positioning said valve means, a conduit for supplying air to the supercharger, valve means for regulating the temperature of the air supplied therethrough, an electric motor for positioning said second named valve means, means responsive to the temperature of the cooled air discharged from the intercooler, limit switches for said motors, and means controlled by said limit switches for connecting said temperature responsive means to said electric motors in sequence to effect sequential operation of said two valve means.

4. In combination, an engine, a supercharger, a conduit connecting the discharge side of the supercharger to the engine intake, a cooler in said conduit, valve means regulating the flow of cooling medium through said cooler, a conduit for supplying air to the supercharger, valve means for regulating the temperature of the air supplied therethrough to the supercharger, means responsive to the temperature of the cooled air discharged from the intercooler, and means for connecting said temperature responsive means to said first named valve means to effect positioning of it or to both said first named valve means and said second named valve means to effect their sequential positioning.

5. In combination, an engine having a carburetor, a supercharger, a conduit connecting the discharge side of the supercharger to the carburetor, an intercooler in said conduit, means for regulating flow of cooling medium through the intercooler, means responsive to the temperature of the air supplied to the carburetor through said conduit for positioning said regulating means, and means responsive to drop in pressure of cooling medium passing through said intercooler to prevent movement of said regulating means in a direction to diminish flow of cooling medium when such drop in pressure is below a predetermined maximum.

6. In combination, an engine having a carburetor, a supercharger, a conduit connecting the discharge side of the supercharger to the carburetor, an intercooler in said conduit, a valve for regulating flow of cooling air through the intercooler, means responsive to the temperature of the air supplied to the carburetor through said conduit for positioning said regulating valve, and means responsive to the drop in pressure of the cooling air across the intercooler to prevent movement of said regulating valve in a direction to diminish flow of cooling air through the intercooler when such drop in pressure is below a predetermined maximum.

7. The combination with an engine having a supercharger for supplying air thereto, an intercooler between the supercharger and the engine for cooling the air on its passages from the supercharger to the engine, valve means for controlling flow of cooling medium through the intercooler, and means for varying the temperature of the air supplied to the supercharger, of means responsive to the temperature of the cooled air on the discharge side of the intercooler for positioning said valve means, and manual means operable when said valve means occupies a predetermined position for positioning said temperature varying means to increase the temperature of the air supplied to the supercharger.

HARRY R. CRAGO.